Dec. 8, 1964   B. L. SUGAR ETAL   3,159,943
COMPOSITE BUILDING SIDING
Filed March 30, 1960   5 Sheets-Sheet 2
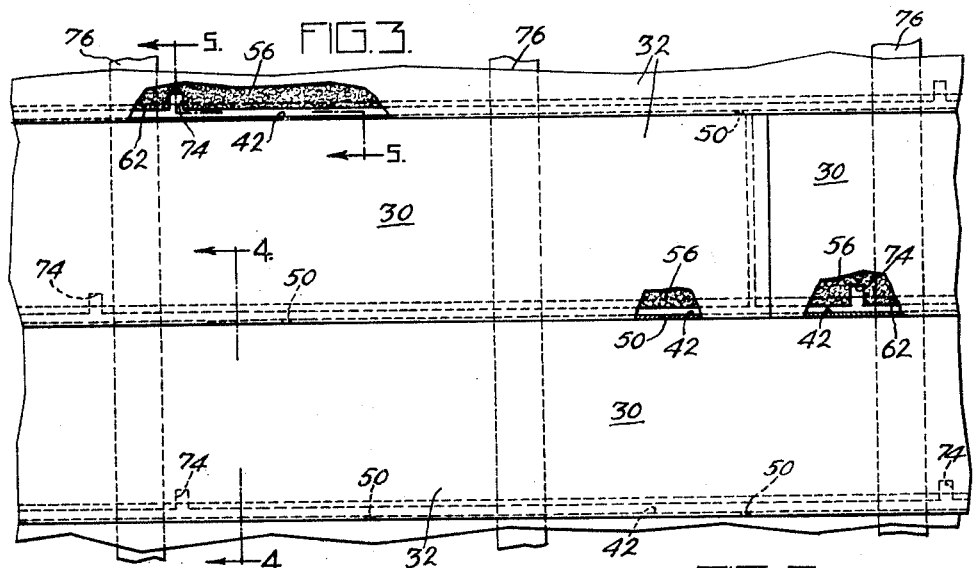
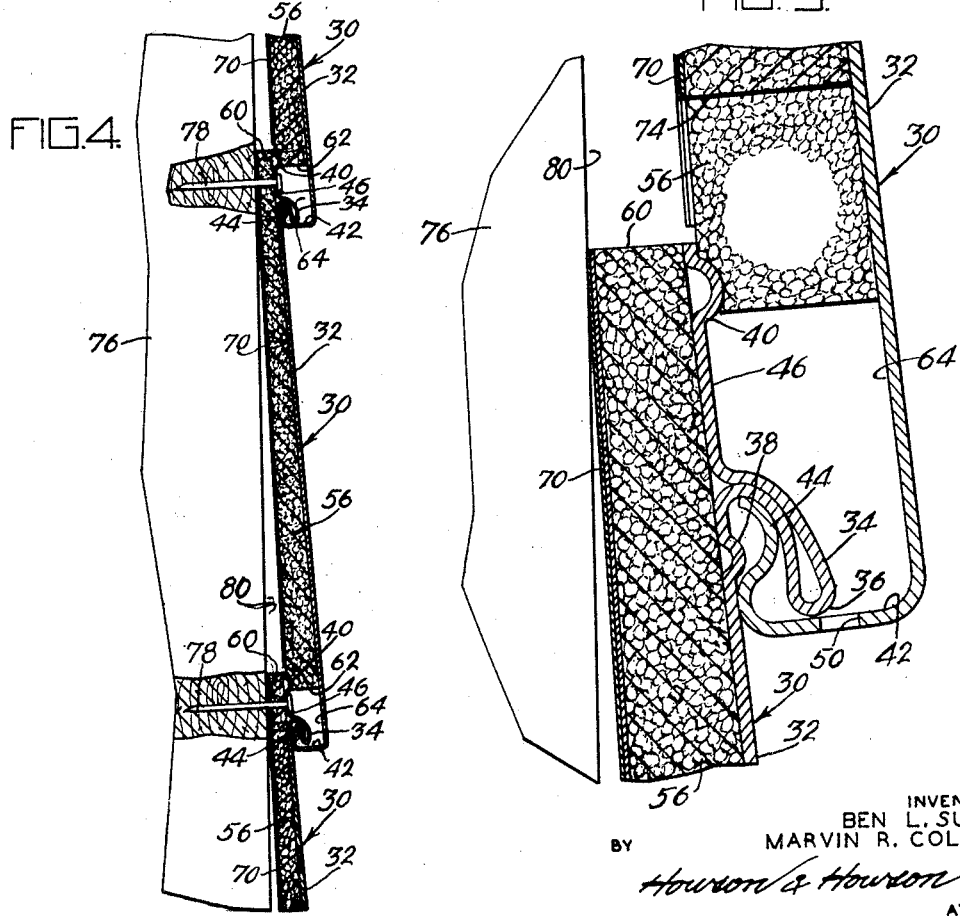
INVENTORS
BEN L. SUGAR
MARVIN R. COLLINS
BY Howson & Howson
ATTYS.

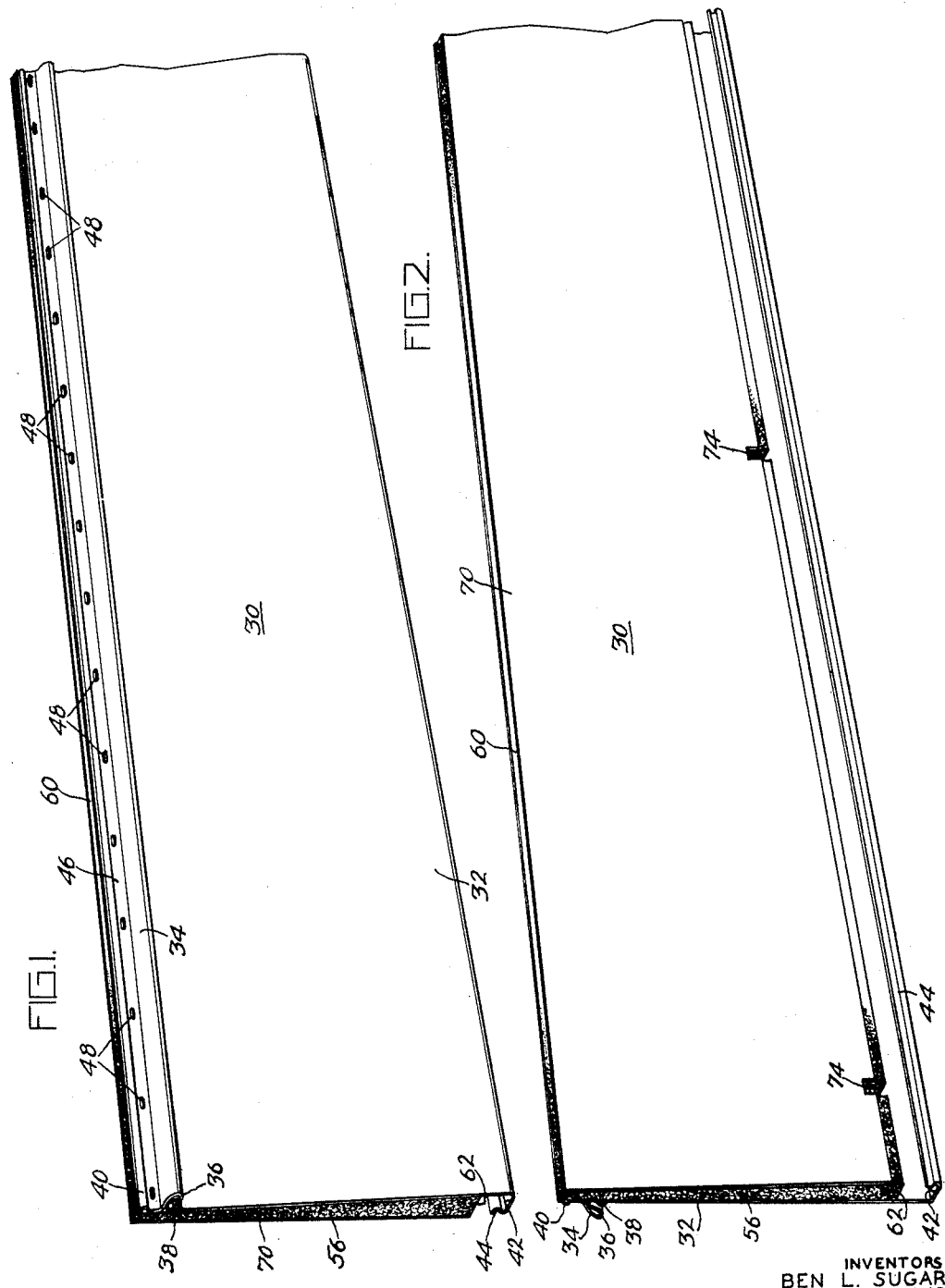

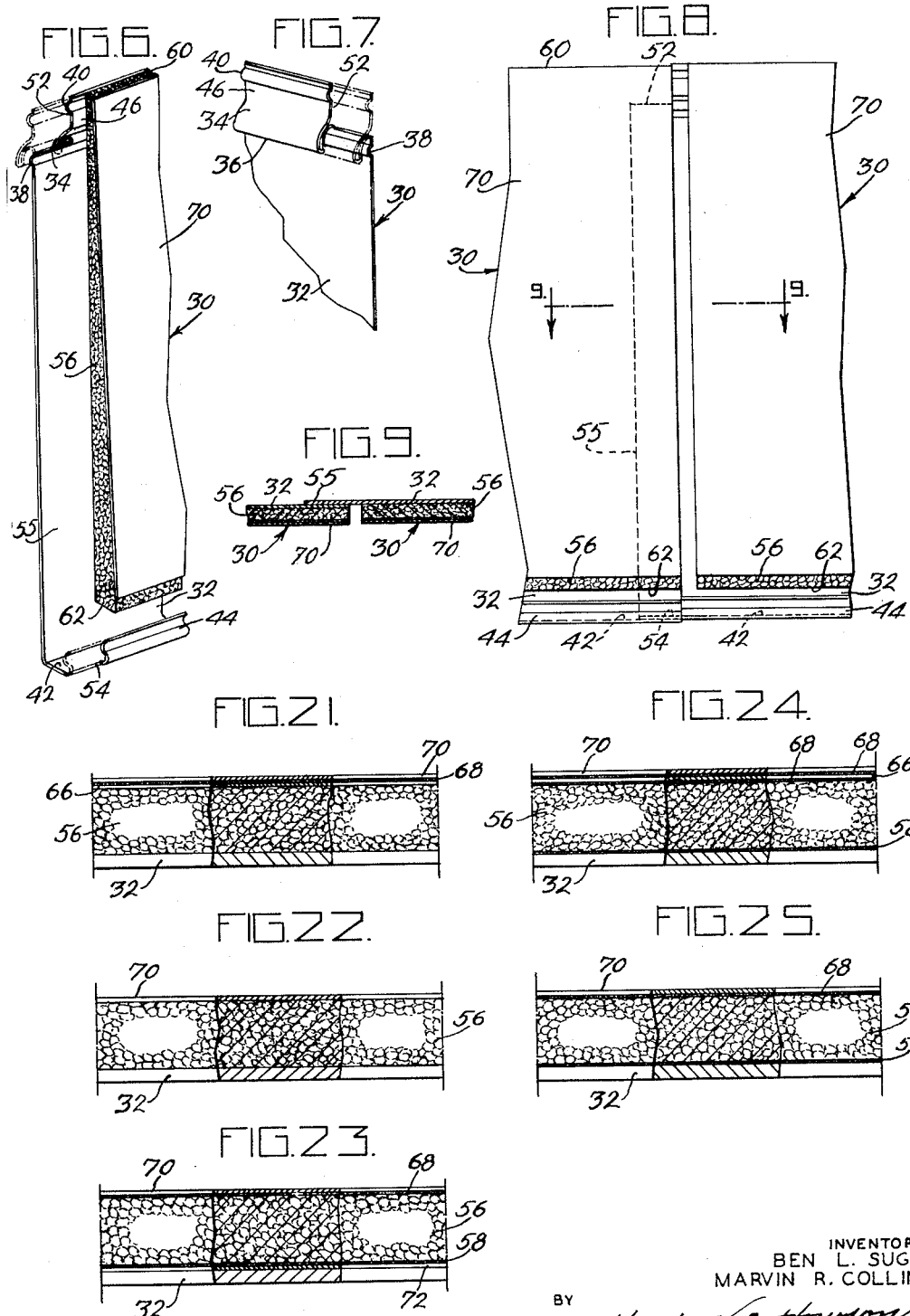

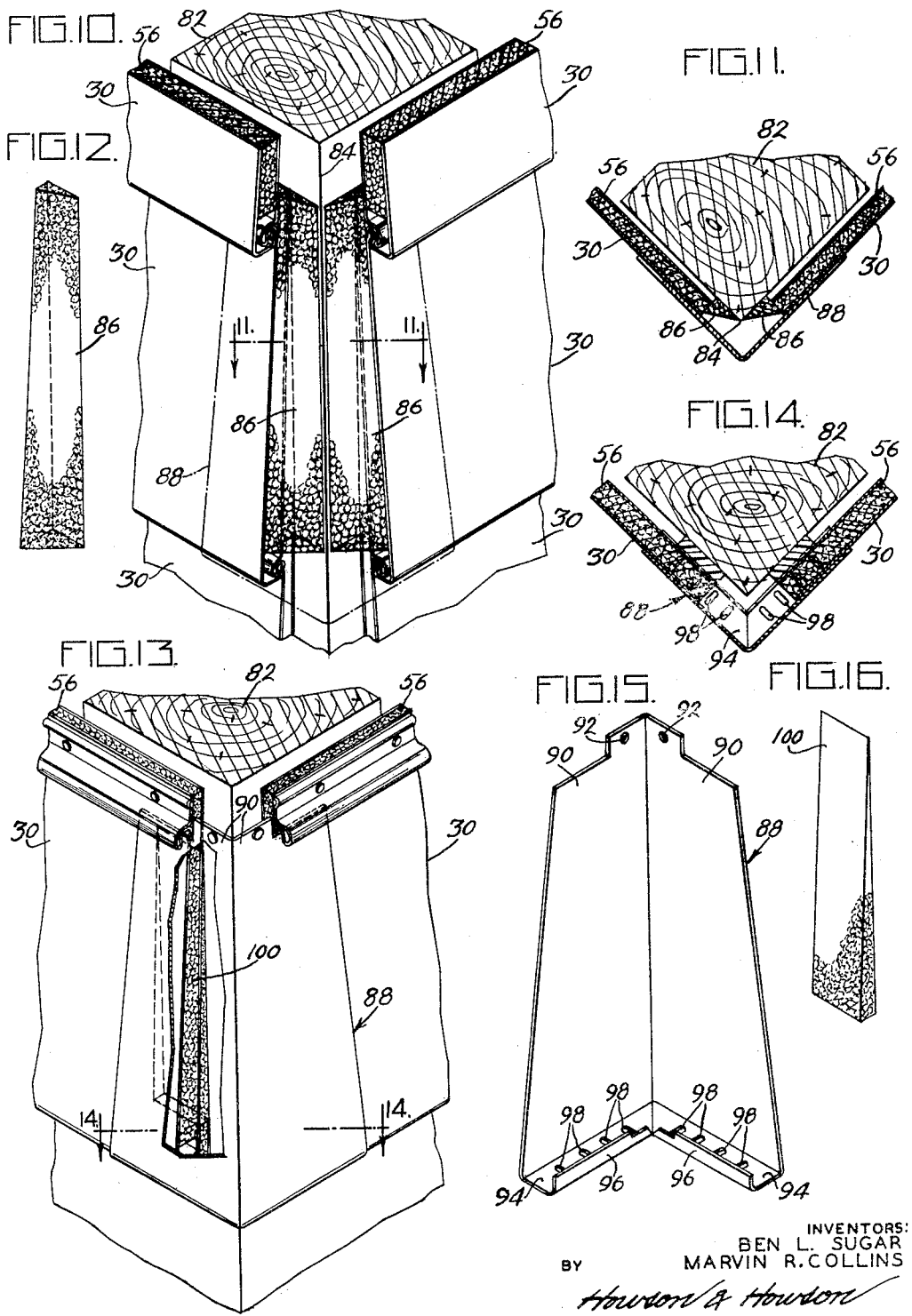

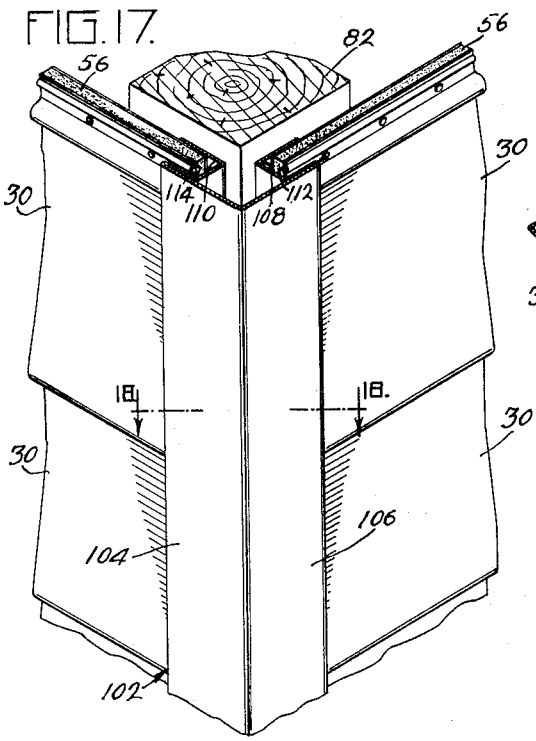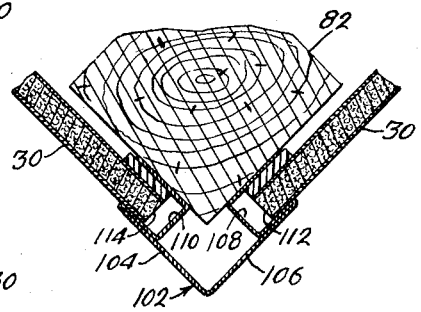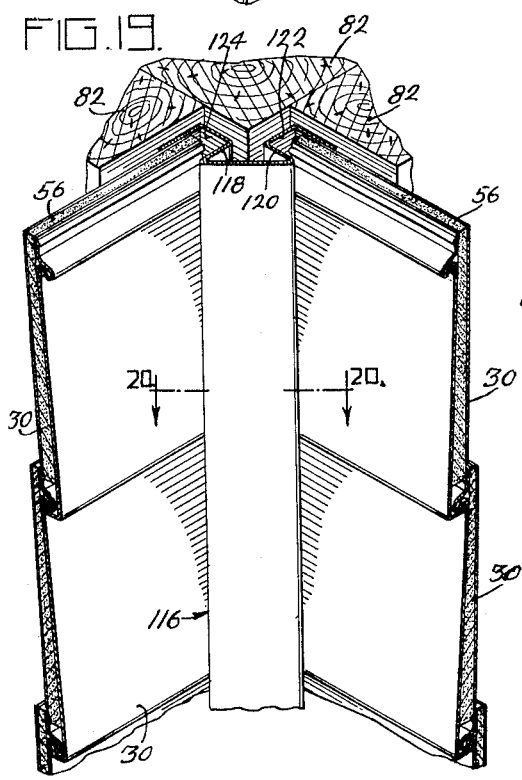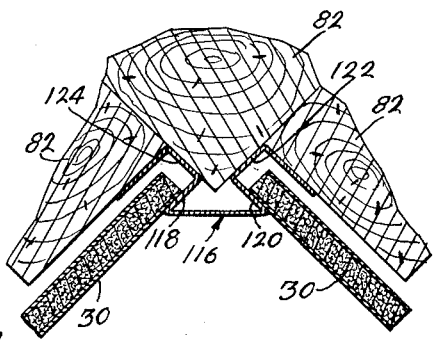
INVENTORS:
BEN L. SUGAR
MARVIN R. COLLINS

United States Patent Office 3,159,943
Patented Dec. 8, 1964

3,159,943
COMPOSITE BUILDING SIDING
Ben L. Sugar and Marvin R. Collins, Akron, Ohio, assignors to Alsco, Inc., Akron, Ohio, a corporation of Ohio
Filed Mar. 30, 1960, Ser. No. 18,554
9 Claims. (Cl. 50—209)

This application is a continuation-in-part of our co-pending application Serial Number 684,875 filed September 19, 1957, now abandoned.

The present invention relates broadly to a composite building or structural siding, and more particularly to a siding structure for houses or other buildings in the nature of a lap siding.

Heretofore, lap siding for buildings has been constructed of metal such as aluminum manufactured in long panels which are fastened horizontally in overlapping relation to the wall of the building, and in some instances has been applied directly over existing siding structures or over a sheathing of a standard type such as Celotex or the like. The present invention however is not only applicable for such uses but additionally is well suited for new wall structures which can be applied directly to the studding of the building without the use or application of building paper over the studs.

It is an object of the present invention to provide such a siding of the lap siding type suitable for buildings of both single and double constructed types wherein a laminated structure provides a structural strength compared to much heavier gauge materials, thereby providing an insulated siding at a reasonable cost.

Another object of the present invention is to provide a siding comprising an outer aluminum surface to the back of which are laminated an insulating material in the nature of a frangible foam of cellular, rigid polystyrene or the like, and a further lamination of aluminum foil with or without a further lamination of kraft paper which, under some circumstances, provides additional strength to the composite panel. In any event, the insulating foamed material and other materials used should be as moisture impermeable as possible, and the foamed material while not absolutely impermeable will be so referred to in this specification since for the purposes of the invention they are for all practical purposes moisture impermeable.

An additional object of the present invention is to provide a multiple laminate siding structure wherein a combination of moisture impermeable aluminum and moisture impermeable foamed insulating material such as polystyrene or polyurethane or similar materials, and moisture impermeable aluminum foil to provide an outer wall construction which will not deteriorate because of common moisture conditions prevailing in building walls.

Another object of the present invention is to provide a siding panel having extreme lightness in weight to reduce dead-weight load and which due to the composite construction of a rigidized nature has high structural strength characteristics.

A still further object of the present invention is to provide a siding panel having an integral moisture impervious backing laminated on an exterior surface which in operation serves to prevent wind and rain infiltration thereby rendering it unnecessary to use building paper over studs in single construction type of buildings.

An additional object of the present invention is to provide a siding panel adapted for application directly to the studs of a building, eliminating the necessity for a sheathing or building paper and which incorporates a foil layer permitting full advantage of the reflective insulation value thereof and to eliminate rain infiltration into the open wall stud space and to control the infiltration of air.

Another object of the present invention is to provide a building siding construction of a nature whereby rain infiltration can be readily dissipated, and in which air channels are provided for proper controlled circulation of air and moisture.

A still further object of the present invention is to provide building siding panel construction having controlled rain and wind infiltration characteristics wherein all materials are moisture impermeable and which result in a properly ventilated wall with selective means to provide individual wall aeration or a controlled flow of air around the entire building structure to thus release moist air by an induced air flow in an air channel to the exterior.

A still further object of the present invention is to provide a siding panel construction which in operation provides a compression seal between superimposed panels in a building siding to separate spaced air channels in the constructed siding together with intercommunicating means between the channels to provide a controlled circulation of air between adjacent channels.

An additional object of the present invention is to provide for a building siding construction including specially vented individual outside and inside corners to maintain proper moisture and air circulation control.

Additional objects, advantages and features of the invention will be more readily apparent from the following detailed description of embodiments thereof when taken together with the accompanying drawings, in which:

FIG. 1 is a fragmentary perspective view of the exterior of a siding panel in accordance with the invention;

FIG. 2 is a fragmentary perspective view of the rear side of the panel of FIG. 1;

FIG. 3 is a fragmentary exterior view of a siding composed of panels of the present invention, parts thereof being broken away for clarity;

FIG. 4 is a sectional view taken on line 4—4 of FIG. 3;

FIG. 5 is a sectional view taken on line 5—5 of FIG. 3;

FIG. 6 is a fragmentary rear perspective view of two siding panels in coacting, abutting assembled relationship;

FIG. 7 is a perspective fragmentary view of the coacting relationship of FIG. 6, from the exterior of the panels;

FIG. 8 is a fragmentary rear elevational view of abutting adjacent panels incorporating an overlap panel joint;

FIG. 9 is a sectional view taken on line 9—9 of FIG. 8;

FIG. 10 is a perspective view of a portion of a building construction showing the corner thereof with the arrangement of mounted panels facilitating air flow control between sides of a structure;

FIG. 11 is a sectional view taken on line 11—11 of FIG. 10;

FIG. 12 is an isometric view of a corner insert member shown in FIG. 10, for providing air flow control;

FIG. 13 is a fragmentary perspective view of a corner of a building construction showing an individual outside corner member applied between coacting panel members;

FIG. 14 is a sectional view taken on line 14—14 of FIG. 13;

FIG. 15 is a rear perspective view of the corner member of FIG. 13;

FIG. 16 is a perspective view of an insulating corner wedge member adapted for use with the corner of FIG. 15;

FIG. 17 is a fragmentary perspective view of a corner construction with a modified type of continuous outside corner;

FIG. 18 is a sectional view taken on line 18—18 of FIG. 17;

FIG. 19 is a perspective view of an interior building corner with a continuous interior corner fitting piece;

FIG. 20 is a sectional view taken on line 20—20 of FIG. 19;

FIGS. 21–25 inclusive are sectional views through different modifications of panel construction, parts thereof being broken away for clarity.

In the various figures of the drawings, like reference characters will be applied to like parts.

The siding structure of the present invention is, as pointed out hereinbefore, applicable over any type of siding whether new or old, whether single or double and with or without the use of sheating and/or building paper over the studding. The invention, however, has unique applicability directly over the studding without the interposition of a building paper or sheathing and for single construction uses. The invention therefore will be described hereinafter as applied directly to studding in a single construction and omitting sheathing or building paper under the siding panels.

The different panels of siding, shown in FIGS. 1 and 2, are adapted for fastening to the building in succession, starting with a bottom panel. Preferably a starter strip, not shown, will be fastened to the bottom of the wall which is to be covered by the siding. The panels per se broadly designated 30 consist of an outer layer of sheet metal and preferably aluminum designated 32, which can be of any proper gauge for proper rigidity and strength. It has been found that this sheet 32 can consist, in the laminated structure of the present invention, of .019 inch gauge aluminum which is acid cleaned, etched, anodized, back coated and front coated, as will be described in detail hereinafter. This is a substantially reduced thickness gauge as compared with heretofore accepted thicknesses due to the laminated structure which imparts strength and rigidity. In proximity to the top of the sheet 32, there is formed in the material thereof an outwardly and downwardly depending tongue 34 in the form of a loop with a reentrant bend at the outer end thereof, and inwardly of the tongue there is an outwardly extending rounded rib lock bead 38. Positioned above the top of the tongue 34, and spaced therefrom, is a compression rib or bead 40. It will be noted that the tongue 34, the rib lock 38 and the compression rib or bead 40 are substantially coextensive with the length of the panel. The lower end of the sheet 32 is provided with a channel at 42 terminating in an upstanding leg 44 having a curvature adapted for engagment within the inner curvature of the member 36, and capable of being retained therein by virtue of the rib lock bead 38 which arrangement is shown in more detail in FIG. 5 of the drawings. Intermediate of the tongue 34 and compression bead 40, the panel includes a nailing strip 46 in which are provided a plurality of spaced elongated nail openings 48 to provide for minor adjustments of the panels when assembling or mounting on the building siding. These, in one acceptable form, will be spaced on 16 inch centers corresponding to normally spaced studs.

The outer sheet 32 prior to assembly into the completed composite siding panel 30 is treated in order to prevent corrosion and to prepare it for proper secure bonding of the various layers of the laminate. This treatment includes submitting the entire sheet on both sides to a degreasing in an acid bath, and followed where required by a deoxidizing process. Subsequently, the sheet is preferably etched to provide for proper adhesion and a chemical bond coat is then applied. Subsequently, a coating is applied to the back side which will prevent corrosion of the material when exposed to atmospheric conditions. It has been found that aluminum when not so treated with an anti-corrosion coating, is subject to a corrosive attack of the material which has highly deleterious effects on the thickness and tensile strength of the material. The coating applied preferably consists of an epoxy resin or similar anti-corrosive material. Epoxy resins which can be employed in this process are well-known. The general characteristic of this class of materials is the presence of epoxy groups, which are of the formula

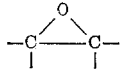

by the reaction of which the epoxy compound may be cured to give a solid, thermoset, resinous material. Ordinarily, epoxy resins contain a plurality of terminal epoxy groups. Usually epoxy resins are of moderately high molecular weight, containing more than ten, and usually more than twenty carbon atoms per molecule. Such epoxy resins have been found to be highly effective as a backing for the desired purpose, although manifestly, other anti-corrosive coatings can be applied within the concept of this invention. This anti-corrosive coating on the back of the sheet has been found highly desirable since, from tests conducted, it is found that on aluminum panels exposed to sun and rain wash, the attack is much less on the surface than underneath or back-side exposure. This is especially true when condition of moisture might prevail along the back side.

The front side of the outer sheet after treatment with the chemical bond coat is preferably provided with a prime coat and then a baked enamel finish which renders it impervious to atmospheric conditions such as sun and rain. The tongue 34, curved portion of upstanding leg 44 and rib lock 38 coact, as shown in detail in FIG. 5, to form an interlock. A plurality of spaced aeration holes 50 are formed along the bottom of channel 42 for the purpose of moisture or water drainage and also air circulation, as will be described hereinafter, and in one preferred embodiment, are spaced at 16 inch intervals. The upper and lower longitudinal ends of the sheets 32 at one edge thereof are notched as indicated at 52 and 54 respectively (FIGS. 6 and 7), to permit installation of the panels in contiguous abutting relationship, and the intermediate portion between the notches indicated 55 provides an overlap panel joint when so assembled.

To the back side of the panel, sheet 32, there is bonded an insulation board consisting of a foamed plastic such as polystyrene, polyurethane or the like, which has a desired rigidity but by the same token consists of relatively thin, frangible walls enclosing cells which if pressed against a portion of the wall surface or a compression rib or bead will give as the cell walls at the surface of the foam are crushed. The insulation board 56 which is laminated to the back side of the sheet 32 can either be formed in situ by applying the foam thereto in a plastic form or can be secured, after formation of the board, by an adhesive such as indicated at 58 in FIG. 24, and which adhesive can be of an appropriate type. Whether formed in situ or as a preformed sheet or board, the insulation board 56 is of wedge shape tapering from a smaller thickness at the upper end of the sheet to a greater thickness at the bottom of the sheet as seen for example in FIG. 4. The foamed material as pointed out hereinbefore must be moisture impermeable so as to prevent deterioration which otherwise might be caused because of a common moisture condition in building walls. It will be noted that the upper edge 60 of the insulation board extends to and along the upper edge of the sheet 32 and the lower edge 62 of the insulation is spaced upwardly from the bottom of channel 42 to form a lower ventilating channel 64 substantially coextensive with the length of the panel. It will be noted that the aeration holes 50 which serve as external moisture control vents open into the lower ventilating channel 64 as seen in FIG. 5. The insulation board 56 terminates short of one longitudinal end of the panels as shown in FIG. 6, to provide for the overlap portion or joint 55 to permit contiguous side-by-side assembly of the various panels to form a siding.

Referring now to FIGS. 21–25 inclusive, subsequent to the application of the foamed plastic forming the insulation board to the sheet either with or without the interposition of an adhesive the laminated panel construction may take various forms. It has been found that when using polystyrene it is preferable to preform the sheet or block 56 in the wedge shaped configuration by forming a substantially rectangular shaped block and then sawing into the wedge shape. Such a preformed polystyrene block is adhered to the sheet 32 by means of the adhesive layer 58 as shown in FIG. 24. When using a foamed material, it is sometimes possible to apply the foaming material directly to the back of the sheet 32 as shown in FIGS. 21 and 22 in a plastic form and without the use of an adhesive. In this form, it has been found that the foam will adhere directly to the pretreated metal of the sheet 32. In FIG. 21, a layer of kraft paper 66 is applied directly to the exposed surface of the polyurethane material and will become bonded thereto. Subsequently, a layer of adhesive is applied to the exterior of the kraft paper at 68 following which a layer or film of aluminum foil 70 is applied to the exterior of the adhesive coating 68.

In the embodiment of FIG. 22 the aluminum foil 70 is applied directly to the exterior surface of the polyurethane insulation sheet 56 without the use of kraft paper or an adhesive. FIGS. 23–25 inclusive are directed to the use of a polystyrene material for the insulating sheet, which is normally preformed and which accordingly requires the use of an adhesive layer 58 to secure it to the aluminum sheet 32.

In FIG. 23, a layer of adhesive 68 is applied and subsequently aluminum foil 70 is applied to the interior surface. An epoxy resin layer 72 in this instance has been applied to the interior face of the sheet 32 then a layer of adhesive 68 to which the polystyrene insulation 56 is laminated.

In FIG. 24, the sheet 32 has a layer of adhesive 58, the polystyrene sheet 56, adhesive layer 68, a kraft paper layer 66 and an adhesive layer 68 and subsequently the aluminum foil 70 in the order given.

In FIG. 25, the laminate consists of the aluminum sheet 32, an adhesive layer 68, the polystyrene foam sheet 56, adhesive layer 68 and aluminum foil 70, in that order. It will accordingly be seen that the laminate can be formed of various combinations, each designed for a specific purpose and each having varying strength and durability characteristics.

The panels formed as hereinabove described, are also provided with a plurality of notches 74 in the lower portion of the insulating sheet 56 and which notches also extend into the lower edge of the aluminum foil sheet 70 as shown in FIG. 2. These notches preferably are at 16 inch intervals along the length of the panels 30 and are for the purpose of providing a controlled and necessary aeration between the lower ventilation channel and an upper ventilation channel formed in a manner to be described hereinafter.

In assembling the various panels to form a siding, a lowermost layer of the panels are assembled in contiguous, abutting side-by-side relationship, reference being made to FIGS. 3, 5, 7 and 8, wherein by virtue of the notches 52, one panel can be moved into abutting relationship with a contiguous panel, with the edges of the outer sheet 32 abutting. As shown in FIG. 8, the overlap is provided at the juncture point of these two panels and as shown in FIG. 9, a slight gap is left between contiguous sheets of the insulating material 56 which is covered by the overlap panel area 55. The individual panels are secured to studs such as at 76 by means of nails or the like 78 inserted through the nail openings 48 as shown in FIG. 4. The nail openings 48 as mentioned, permit a shifting of the panels with respect to the nails when the siding shifts over the surface of the wall as the wall and panel expand and contract unevenly with changes in the temperature. Referring against to FIGS. 4 and 5, after one longitudinal layer or array of panels has been mounted on the studs, the next superimposed higher layer are interconnected by virtue of the interlock formed by tongue 34 and the upstanding leg 44. It is to be noted that the aluminum foil 70 is in the assembled relationship of the superimposed panels or rows thereof, is spaced above the top edge of the outer aluminum sheet 32 as shown in FIG. 5 which provides a thermal break eliminating any metal-to-foil contact which is of importance for proper insulation to prevent transmission of heat and cold as will be obvious. There is accordingly provided a resin coated insulation foil on the kraft paper covering all exposed inside areas of the foam except for the thermal break area. The compression rib or bead 40 coacts with the lower inner end of insulating sheet 56 as shown in FIG. 5 by pressing into a portion of the insulation material and this compression seal between the insulation material and the top of the panel underneath prevents infiltration from the lower air channel into an upper air channel 80 formed between or behind the individual panel and an underlying sheath or studs. The notches 74 in this assembled relationship provide the remainder of the needed aeration in the upper air channel to provide a controlled circulation of air between the upper and lower air channels. It has been found that air infiltrates the assembled panels at the vertical overlap joints and through the aeration vents located in the bottom of the panels. The air infiltration into the upper air channel, however, at the overlap vertical joints where the foam butts together is rather meager and infiltration from the lower air channel into the upper air channel is prevented by the compression seal. The notches are so devised as to spacing and size as to give the desired controlled circulation of air. Rain, which with heavy winds, can be driven through the vertical overlap joints of the siding, while being rather meager will nevertheless run down the foam edges into the lower interlock channel 64 and be dissipated to the outside of the panel through the aeration vents 50. As pointed out, the insulation sheets can butt together behind the panel overlaps 55 or be slightly spaced with respect thereto. When a siding has been assembled as described above, there is still the problem of the ends of the channels and also the corners of the buildings. Reference is now made to FIGS. 10–20 inclusive. In FIG. 10 a corner post or stud 82 is shown in proximity to the outside corner 84 of which a plurality of mounted or assembled panel ends are shown and which terminate there. In order to provide individual wall aeration if desired, small wedge-shaped foamed blocks 86 of the same insulating material as sheet 56 and shown in detail in FIG. 12 are utilized which cover the edges of each panel at the corners of the house to block either the upper or lower, or both, air channels. If desired, a mastic material could be substituted at the option of the builder for these wedge-shaped blocks. In the embodiment shown in FIG. 10, the lower channels remain open for the purpose of controlled ventilation. A preformed outside corner member 88 is mounted over the edges of the panels at the corner and secured in any desired manner for the purpose of finishing the exterior of the panel and at the same time not interfering with moisture drainage or controlled air flow. In FIG. 13, a discontinuous preformed corner member is shown at 88 having at its upper edge wings 90 with holes 92 for securing them to the structure by nails such as at 78. The configuration of this is similar to the standard lap siding and the wings 90 fit into abutting relationship with the ends of the respective panels 30, 30 at the corner. The lower edges of these corner members 88 are inturned to form channels at 94 with upstanding legs 96 for coaction with the inner sides of the panels and moisture drainage and vent openings such as at 98 may be provided in the material of the base of the channel for obvious reasons. In this embodiment of the invention, wedge-shaped members 100 are inserted behind the panels for the purpose of the controlled wall aeration. These slightly differ from the configuration shown in FIG. 12 and as will be readily understood, this feature can provide individual wall aeration, or by leaving the bottom channel open, a controlled flow of air may be had around the entire house, thus release of moist air might be set-up by the induced air flow in the lower air channel resulting from wind pressures on the external vent holes.

It is to be noted that in the embodiment of FIG. 10, the corner member 88, above a bottom one at this corner, has no perforated openings in the lower edge thereof. The embodiment shown in FIGS. 13, 14 and 15 is for a lower outside corner at the bottom of each outside corner wall.

In FIG. 17 there is shown a continuous exterior corner member for finishing the corner in a manner similar to that shown in FIGS. 10–14 inclusive which show the use of individual corner members. This corner member 102 has sides 104, 106 at substantially right angles to one another merging at the corner. The edges are doubled back interiorly and formed in the shape of channels 108, 110 for the reception of the edges 112, 114 of panels 30, 30. The wedges shown at 100 are similar to the embodiment shown in FIG. 16 for the purpose of closing off the channels.

FIGS. 19 and 20 show an interior continuous corner member 116 having sides 118 and 120 bent at an acute angle to the exterior surface and thence to form channels 122, 124 for the purpose of covering and confining the edges of the panels 30 meeting at this inside corner.

It will be seen accordingly, that the present invention provides a multiple lamination product which has a rigidized characteristic almost comparable to a regular wood board siding or paneling, insofar as handling is concerned, which has particular use in building sidings. In some of the embodiments, the distinct advantage is obtained in single constructed homes as to preclude the necessity of exterior sheathing or building paper over the studs. The elimination of the building paper or sheathing allows full advantage of the reflective insulation value of the foil applied to the polystyrene board and/or kraft paper. In order to eliminate building paper on both single and double constructed homes, the product is so designed as to eliminate rain infiltration into the open wall stud space and to positively control the infiltration of air. The plural air channel, the interposition of a compression seal therebetween, and the notches all permit this controlled circulation of air between the upper and lower air channels and individual wall aeration can be obtained by means of the wedge-shaped foam material blocks and/or plastic material at the corners. Release of moist air can be sped up by the induced air flow in the lower air channel resulting from wind pressures on the external vent holes and which vent holes also take care of moisture or rain accumulation. All of the materials utilized in this laminate construction are moisture impermeable as defined hereinbefore with the exception of kraft paper which is adequately protected and serves the additional feature of absorbing solvent from the adhesive when so applied or the plastic material depending upon the precise structure. This combination of the moisture impermeable materials with the proper ventilation, protects against wall decay losses.

Manifestly minor changes in details of construction can be effected without departing from the spirit and scope of the invention as defined in and limited solely by the appended claims.

We claim:

1. A laminated lap siding panel for the exterior wall sheathing of buildings, said panel including an outer metal layer, an insulation layer of foamed rigid plastic material adhered to the inner surface of said metal layer, said plastic material being impermeable to penetration and absorption of moisture, and an inner moisture barrier layer of metallic insulation foil on the inner surface of said insulation layer, said metal layer having partial interlock means at the top and bottom edges thereof adapted for interengagement of said panel with identical panels above and below it, the bottom edge of said insulation layer being spaced above the bottom edge of said metal layer, said foil terminating short of the lower edge of said insulation layer a distance sufficient to prevent contact between said foil and the metal layer of a lower interengaged panel thereby forming a thermal break between interengaged panels, the lower edge of said metal layer being turned inwardly at the bottom and then upwardly at its inner edge forming a channel and coacting with the spaced bottom edge of said insulation layer to form a lower ventilating channel below and spaced from the bottom of the insulation layer, said channel having spaced vent openings therethrough opening into said channel from the exterior thereof, and a plurality of notches in the lower edge of said insulation layer extending upwardly therethrough and providing for controlled air circulation between said lower ventilating channel and the rear of said panel, said panel being adapted when applied as an external building wall sheathing component to prevent moisture condensate from forming on the inner side thereof by permitting flow of moisture vapors through said notches into said ventilating channel and dissipation thereof from the channel into the outer atmosphere through said vent openings.

2. A laminated lap siding panel as claimed in claim 1, including an outwardly extending bead in proximity to the upper end of said metal layer adapted for compression into the lower portion of the insulation layer of an upper interengaged panel to provide a sealing engagement between adjoining interengaged panels.

3. A laminated lap siding panel as claimed in claim 2, including a layer of kraft paper interposed between said insulation layer and said metallic foil and being adhered to said insulation layer and said foil.

4. A laminated lap siding panel as claimed in claim 3, the inner surface of said metal layer having a coating of anti-corrosion material.

5. A laminated lap siding panel as claimed in claim 1, wherein said plurality of notches extend through the lower edge of said metallic foil.

6. Laminated lap panel siding for the exterior wall sheathing of buildings, said siding comprising a plurality of identical interengaged panels assembled in longitudinally contiguous and abutting rows, each panel including an outer metal layer, an insulation layer of foamed rigid plastic material adhered to the inner surface of said metal layer, said plastic material being impermeable to penetration and absorption of moisture, and an inner moisture barrier layer of metallic insulation foil on the inner surface of said insulation layer, a lower ventilating air channel formed at the bottom of each panel in spaced relation from the lower edge of the insulation layer, the bottom of each panel overlapping and in contact with the exterior of the top of the panel immediately therebelow and forming an upper air channel between a supporting member and the interior of the panels, ventilating openings in the bottom of said lower channel, and spaced notches in said insulation layer and metallic foil interconnecting said upper and lower air channels.

7. Laminated lap siding as claimed in claim 6, said panels being arranged at a corner junction in spaced apart relationship, and wedge shaped inserts of foamed plastic material positioned at the ends of said panels and closing off at least one of said upper air channels for controlled air ventilation flow.

8. Laminated lap siding as claimed in claim 7, including a corner member covering said ends of said panels and said insert.

9. A laminated lap siding panel for external wall sheathing for buildings, said panel comprising an outer metal layer, a layer of insulation of foamed rigid plastic material adhered to the inner surface of said metal layer, an inner moisture barrier layer of metallic foil on the inner surface of said layer of insulation, the lower edge of said metal layer being turned inwardly at the bottom and then upwardly at its inner edge forming a lower ventilating channel spaced from the bottom edge of the layer of insulation material, said channel having spaced vent openings therethrough opening into said channel from the exterior thereof, a plurality of notches in the lower edge of said layer of insulation extending upwardly therein providing controlled air circulation between said lower ventilating channel and the rear of said panel, and means adapting the top and bottom edges of said panel for interengagement with identical panels above and below it, said panel being adapted when applied as an external building wall sheating component to prevent moisture condensate from forming on the inner side thereof by permitting moisture vapors to flow into said lower ventilating channel and be dissipated therefrom into the outer atmosphere.

References Cited in the file of this patent

UNITED STATES PATENTS

| | | |
|---|---|---|
| 1,968,228 | Smith | July 31, 1934 |
| 1,971,517 | Belding | Aug. 28, 1934 |
| 1,993,593 | Carrozza | Mar. 5, 1935 |
| 2,019,233 | Nicol | Oct. 29, 1935 |
| 2,042,890 | Fulenwider | June 3, 1936 |
| 2,128,824 | Hubschman | Aug. 30, 1938 |
| 2,173,774 | Birch | Sept. 19, 1939 |
| 2,173,815 | Slisz | Sept. 19, 1939 |
| 2,181,074 | Scott | Nov. 21, 1939 |
| 2,183,620 | Myers | Dec. 19, 1939 |
| 2,205,534 | Lytle | June 25, 1940 |
| 2,228,362 | Patterson | Jan. 14, 1941 |
| 2,403,318 | Weseman | July 2, 1946 |
| 2,427,762 | Carr | Sept. 23, 1947 |
| 2,442,977 | Hirsch | June 8, 1948 |
| 2,641,029 | Trimmer | June 9, 1953 |
| 2,659,323 | Alvarez | Nov. 17, 1953 |
| 2,682,236 | Holmstrum | June 29, 1954 |
| 2,740,166 | Siering | Apr. 3, 1956 |
| 2,766,861 | Abramson | Oct. 16, 1956 |
| 2,820,257 | Newton | Jan. 21, 1958 |
| 2,899,716 | Woodward | Aug. 18, 1959 |
| 3,001,332 | Wilder | Sept. 26, 1961 |
| 3,045,293 | Potchen | July 24, 1962 |

OTHER REFERENCES

Alsco Aluminum Siding Circular F–10574–BS, October 1957, Alsco Inc., Akron, Ohio.